United States Patent [19]

Kajiwara

[11] Patent Number: 5,177,462
[45] Date of Patent: Jan. 5, 1993

[54] CAR INTERVAL CONTROL APPARATUS

[75] Inventor: Yasuya Kajiwara, Himeji, Japan

[73] Assignee: Mitsubishi Denki K.K., Tokyo, Japan

[21] Appl. No.: 668,551

[22] Filed: Mar. 13, 1991

[30] Foreign Application Priority Data

Mar. 28, 1990 [JP] Japan .................................. 2-79620

[51] Int. Cl.⁵ .......................... B60Q 1/00; G08G 1/16
[52] U.S. Cl. .................................... 340/435; 340/436;
340/903; 340/901; 340/937; 340/942; 358/105;
358/125; 180/167; 180/169; 180/271
[58] Field of Search ............... 340/435, 903, 901, 436,
340/937, 942; 358/107, 108, 110, 113, 125;
342/47, 55, 66, 126, 118, 450, 451;
180/167–169, 271

[56] References Cited

U.S. PATENT DOCUMENTS

| | | | |
|---|---|---|---|
| 4,539,590 | 9/1985 | Gage | 358/107 |
| 4,709,264 | 11/1987 | Tamura et al. | 358/93 |
| 4,779,095 | 10/1988 | Guerreri | 180/169 |
| 4,908,704 | 3/1990 | Fujioka et al. | 358/105 |
| 5,026,153 | 6/1991 | Suzuki et al. | 180/167 |

FOREIGN PATENT DOCUMENTS 3839513  5/1990  Fed. Rep. of Germany .
61-4700  2/1977  Japan .
60-33352  8/1985  Japan .
61-6349  2/1986  Japan .
2052021  1/1981  United Kingdom .

Primary Examiner—Donnie L. Crosland
Attorney, Agent, or Firm—Sughrue, Mion, Zinn, Macpeak & Seas

[57] ABSTRACT

A car interval control apparatus composed of a tracking type range finder having a pair of optical systems arranged in a parallel relation and an image sensor disposed in connection with each of said optical systems, wherein a window is formed for a picture image of an object that is to be tracked and sensed by each of the image sensors. The distance to the object is measured, in accordance with a triangular method, on the basis of a shift of position of the picture image of the object displayed in the window. A observing means which emits light and observes forcible entry of an intervening car into a lane in front of and close to the driver's car by detecting light reflected by the intervening car. A control device controls the distance between the drivers car and the preceding car by using a signal produced from the tracking type range finder and generates an alarm when the forcibly entered car is detected by the observing means during the operation of the controlling of the distance of the cars.

6 Claims, 4 Drawing Sheets t = to t = to + Δt

CAR INTERVAL CONTROL APPARATUS

BACKGROUND OF THE INVENTION

1. Field Of The Invention

The present invention relates to a car interval control apparatus which controls the distance between a car driven by a driver and a car running ahead of or preceding the driver's car.

2. Discussion of Background

There have been proposed car interval control apparatuses for controlling a car interval in publications such as Japanese Examined Patent Publication Nos. 4700/1986 and 6349/1986. In such prior-art techniques, radio waves or light is used to measure the car interval. An example of measuring the car interval is shown in FIG. 4 wherein emitted light is caused to reflect by an object to be measured 9 and a time required for reciprocation of the light is measured.

The car interval control apparatus as shown in FIG. 4 comprises a car interval range finder 1, a throttle actuator 2 to control the output of the engine, a brake actuator 3 to control the brake of the car, a control unit 4, a set switch 5, a brake switch 6 and a car speed sensor 7.

The operation of the car interval control apparatus as shown in FIG. 4 will be described.

When the driver turns on the set switch 5 of the car interval control apparatus, the control unit 4 reads the car speed at that time from the car speed sensor 7 and calculates a car interval which is considered to be safe. When the distance between the driver's car and a preceding car measured by the range finder 1 is larger than the distance considered to be safe obtained by the calculation in the control device 4, the car is driven at the speed when the set switch was turned on. However, when the former distance is shorter than the latter distance, the car is decelerated by the actuation of the throttle actuator 2 to thereby reduce the output of the engine. When the distance between the driver's car and the preceding car becomes small in spite of the actuation of the throttle actuator 2, the control unit 4 actuates the brake actuator 3 so that the car is further decelerated to thereby keep a safe car-interval distance from the car 9. The conventional car interval control apparatus thus described has, however, a disadvantage that the range finder 1 can not discriminate whether the reflected waves or light come from the preceding car or they come from an object at a road side.

There has been proposed a car interval control apparatus using a tracking method which is disclosed in a Publication such as Japanese Examined Patent Publication No. 33352/1985. In this car interval control apparatus, a window 10 is formed in a picture image formed by an image sensor and shown on a display screen. Then, the picture of a car is provided in the window 10 at the time of $t=t_0$ as shown in FIG. 5a. A picture image which most resembles the picture image in shape and size is determined from picture images at the time of $t=t_0+\Delta t$ (as shown in FIG. 5b), and a new window 10 is set for the newly determined picture image. By conducting this operation in a time-sequential manner, the preceding car is tracked by forming the picture image in the window 10.

The above-mentioned conventional car interval measuring apparatus had, however, a disadvantage that it could not discriminate an object to be tracked and it simply measured the distance between the driver's car and an object (which may not be a car) ahead of the driver's car, and accordingly, it was not always able to measure the distance between the driver's car and a preceding car which runs ahead the driver's car, and therefore, it often caused an erroneous operation.

Further, the conventional car interval measuring device had a problem of safety. Namely, in a case that there was a car intervening at the front of the driver's car, most conventional cars were not able to detect an object close to but out of the forward center of the driver's car, so that the detection of the intervening car was delayed to thereby a potential danger.

SUMMARY OF THE INVENTION

It is an object of the present invention to provide a car interval control apparatus capable of measuring a car interval, by driver's option, by tracking an object which runs ahead of the driver's car; of controlling correctly the car interval in accordance with the speeds of the preceding car and the driver's car; and of monitoring the presence or the absence of an intervening car wherein if there is the intervening car, an alarm is generated by the detection of it to thereby assure the safety of the driver.

The foregoing and other objects of the present invention have been attained by providing a car interval control apparatus which comprises a tracking type range finder comprising a pair of optical systems arranged in a parallel relation and an image sensor disposed in connection with each of said optical systems wherein a window is formed for the picture image of an object to be tracked and sensed by each of the image sensors, and the distance to the object is measured, in accordance with a triangulation method, on the basis of a shift of position of the picture image of the object displayed in the window; an observing means which emits light and observes forcible entry of another car into a line in front of and close to the driver's car by detecting light reflected by the another car; and a control unit which controls the distance between the driver's car and the preceding car by using a signal produced from the tracking type range finder and which generates an alarm when the forcibly entered car is detected by the observing means during the operation of the controlling of the distance of the cars.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
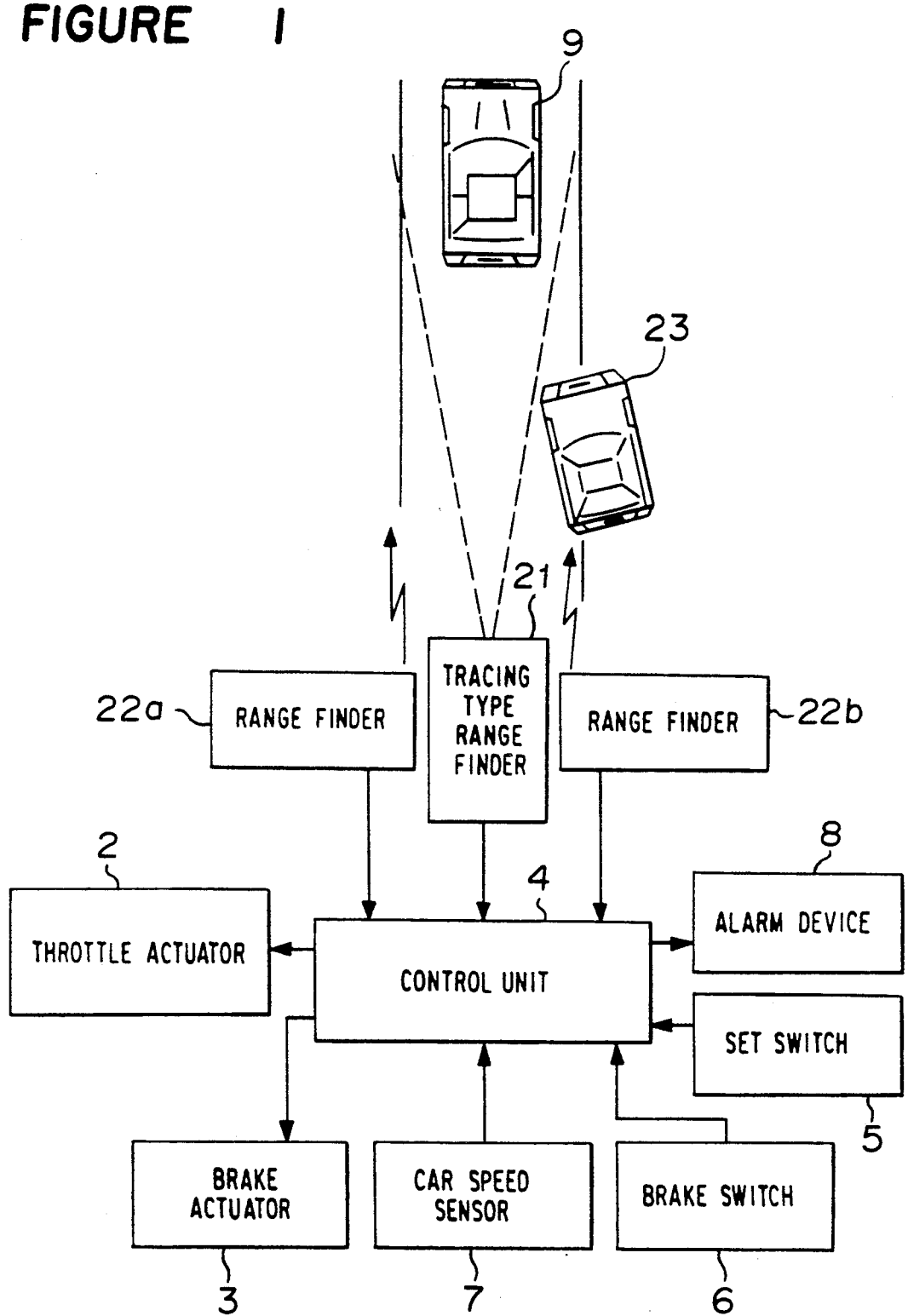
FIG. 1 is a block diagram showing a general construction of an embodiment of the car interval control apparatus according to the present invention.
Figure 4:
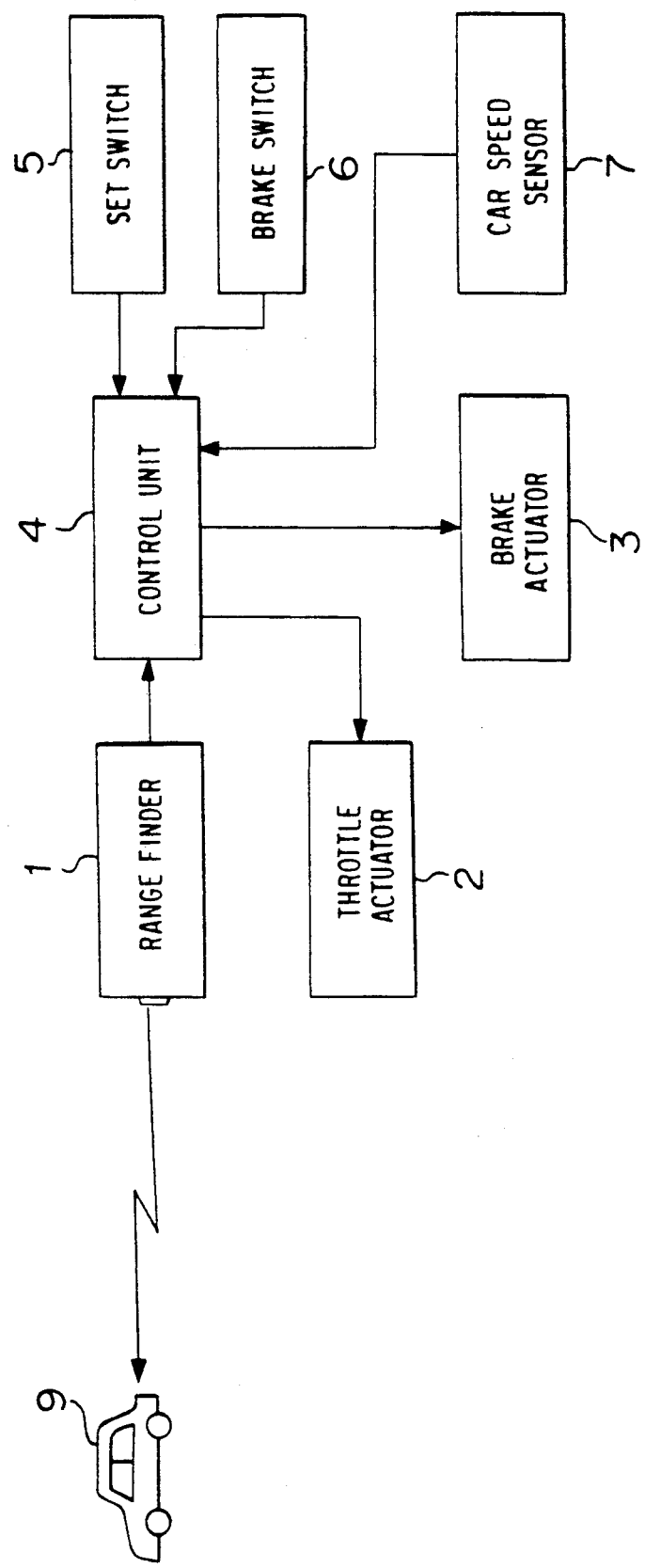
FIG. 4 is a block diagram showing a general construction of a conventional car interval control apparatus.

An embodiment of the car interval control apparatus of the present invention will be described with reference to the drawings. In FIG. 1 which is a block diagram showing the general construction of the embodiment of the present invention. reference numerals 2 through 7 and 9 designate the same parts as in FIG. 4. and therefor. description of these parts is omitted.

In FIG. 1. a reference numeral 21 designates a tracking type range finder and numerals 22a and 22b are respectively optical type range finders capable of emitting light to an object and detecting the light reflected from the object. The optical type range finder may be of a type capable of measuring a time required for the light to go and return. or may be of a type using a triangulation method. The optical type range finders 22a and 22b are respectively provided at both sides of an automobile (not shown) to observe an object at a relatively short distance in front of the driver's car from both sides of the car. Namely. the pair of range finders observe the intervention of a car 23 in a region in front of and close to the driver's car.

A numeral 8 designates an alarm device which is controlled by the control unit 4 and generates an alarm when the intervening car 23 enters in the region in front of and close to the driver's car.

Figure 2:
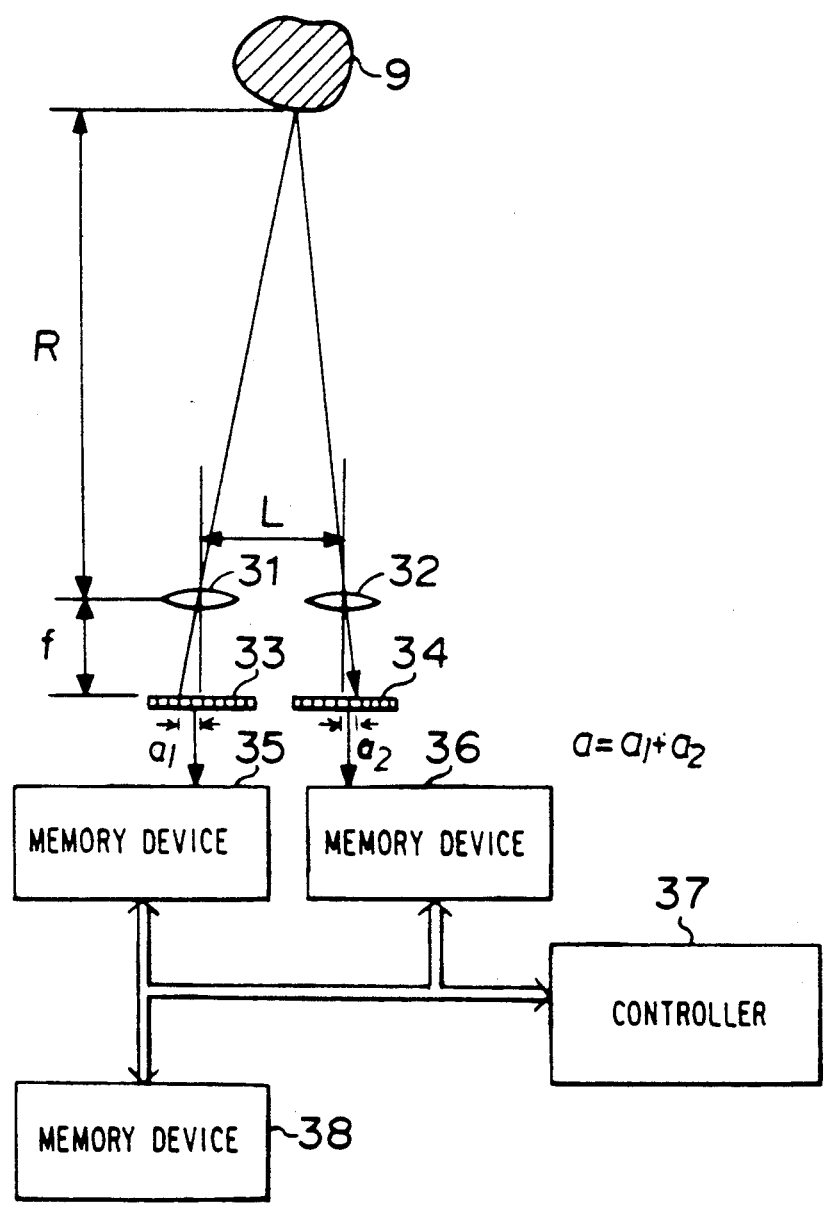
FIG. 2 is a block diagram showing a general construction of an embodiment of the tracking type range finder used for the embodiment as in FIG. 1.

As shown in FIG. 2. the tracking type range finder 21 comprises a pair of optical lenses arranged in parallel to each other. image sensors 33. 34 each arranged in rear of each of the lenses and memory devices 35. 36. Each image formed by each of the lenses 31. 32 is focused on each of the image sensors 33. 34. and each signal produced at each of the image sensors 33. 34 is converted into a digital value. Each of the digital values. which forms each image. is stored in each of the memory devices 35. 36. The image in each of the sensors is renewed at very short time intervals (e.g. every 1/30 second).

Figure 5A:
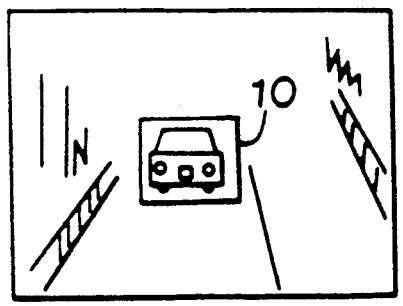
FIGS. 5a and 5b are respectively diagrams showing a method of tracking a preceding car in the conventional apparatus.
Figure 5B:
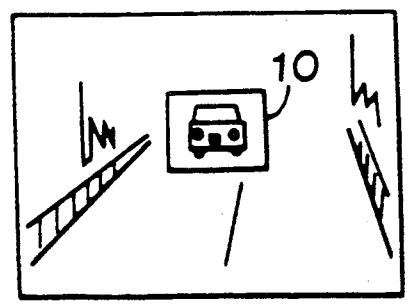

A controller 37 forms a window (as shown in FIGS. 5a and 5b) which is designated by the driver. for picture images stored in the memory device 35. For instance. the same picture image as the picture image in the window formed in the left side picture image (which is stored in the memory device 35 through the image sensor 33) is found at a position which is slightly shifted to the right side in the right side picture image (which is stored in the memory device 36 through the image sensor 34). Assuming that the deviation in position of the picture image is a. the focal length of each of the lenses is f and the distance between the fundamental lines of the right and left optical systems is L as shown in FIG. 2. the distance R between the lenses and an object 9 can be calculated by the following equation (1) in accordance with the principle of the triangulation:

$$R = f \cdot L / a \qquad \text{...(1)}$$

Thus. the distance to the object of which picture image is formed in the windows 10 is obtainable. The picture image in the memory device 35 obtained by the above-mentioned operations at that time is transferred together with the window 10 to a memory device 38. The picture image in the memory device 36 is erased since the picture image at the next instant time is recorded on the same position. After a short time has passed from the transfer (i.e. at the time of $t = t_0 + \Delta t_1$). images formed on the image sensors 33. 34 are respectively transferred to the memory devices 35. 36.

Then. a picture image which most resembles the picture image formed in the window in the screen image of the memory device 38 is found in the memory device 35. which stores the latest picture image. and a fresh window is set for the found picture image. Thus, by comparing the picture images in the windows. the car interval at the newest time can be obtained. By subsequently repeating the above-mentioned operations, the object displayed in the windows is traced and the distance to the object can be measured.

The construction and the operation of the tracking type range finder 21 have been described. However, the tracking type range finder 21 has an extremely narrow sight field at a close distance because the sight field is limited to only the objects inside of the windows. Accordingly. the intervention of a car at a close distance can only be detected when the car comes fairly in front of the driver's car. Accordingly. there is a problem of safety in controlling the car interval.

In the present invention. the range finders 22a, 22b are additionally provided to observe the intervention of a car in front of and close to the driver's car. The range finders 22a. 22b need not discriminate the shape of a certain object. but they are enough to detect whether there is an obstacle on the path of the driver's car. Accordingly. the range finders are desirable to be of the type that emits light and detects the light reflected from the object. For example. a light source emitting an infrared ray can be used.

When there is no obstacle or object in front of the driver's car within a certain distance. the reflection light is not detected. whereas when there is the obstacle at the above-position. the reflection light is detected. whereby the distance to the obstacle can be measured.

Figure 3:
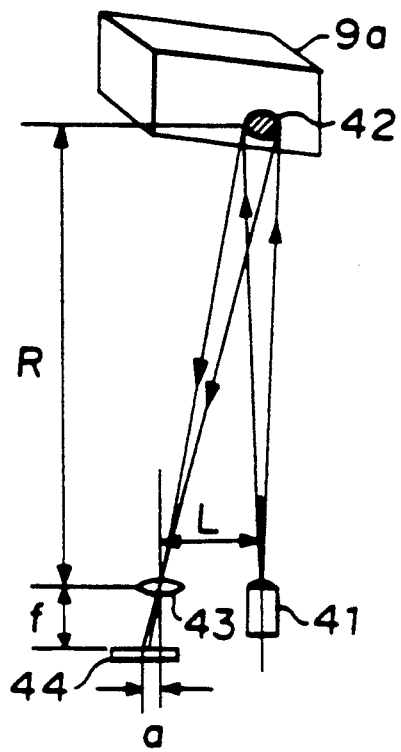
FIG. 3 is a schematic diagram showing a general construction of an optical type range finder used for the embodiment as shown in FIG. 1.

There are two methods of measuring the distance. there are: 1) a method of emitting light modulated in a specified manner. which has a short pulse width. and measuring a time required for the light to go and return. and 2) a method as shown in FIG. 3 wherein light is emitted from a light emitting device 41 to form a spot image on the surface of an obstacle 9a; that is the spot image 42 is focused on a light receiving element 44 through a lens system 43. so that the distance between the light emitting device 41 and the obstacle 9a is obtainable by the triangulation method. In this case, when the distance between the optical axis of the lens system 43 and the focusing position is a, the focal length of the lens systems is f and the distance between optical axis of the light emitting device 41 and the optical axis of the lens system 43 is L, the distance R can be obtained by the equation (2) as follows (same as the equation (1)):

$$R = f \cdot L / a$$

The number of the range finders 22a, 22b can be reduced to one, or, in the alternative more than two range finders can be installed.

In the car interval control apparatus of the present invention, when the set switch 5 is turned on by the driver, the distance between the driver's car and a preceding car (shown as the object 9). which is designated by the tracking type range finder 21. is measured, while the speed of the driver's car is measured in the control unit 4 by using the signal of the car speed sensor 7. As a result, the driver's car can be driven maintaining a suitable car interval depending on the speed of the driver's car. In a case that the speed of the preceding car is increased to be faster than the speed at the time when the set switch 5 is turned on, the car interval is longer. In this case, the driver's car is controlled to be a constant speed cruising state at the speed when the set switch 5 is turned on.

On the contrary, when the speed of the preceding car is reduced by, for instance, a braking operation, the car interval becomes shorter. In this case, the output of the engine is reduced by actuating the throttle actuator 2 by an instruction from the control unit 4. Nevertheless, when the car interval falls into a dangerous zone, the speed of the driver's car is further reduced by operating the brake by the action of the brake actuator 3 on the basis of the control of the control unit 4.

In a case where there is an intervening car 23 (FIG. 1) during the cruising of the driver's car and the range finders 22a, 22b detect the intervening car, a signal is supplied to the control unit 4 so that the alarm device 8 is operated to generate an alarm. In this case, however, when it is found that the distance between the driving car and the intervening car 23 becomes small in view of the rate of change of the distance, the control unit 4 actuates the throttle actuator 3 and/or the brake actuator 6 to thereby reduce the speed of the driving car.

On the other hand, when the distance becomes large, the generation of an alarm is sufficient and it is unnecessary to actuate the throttle actuator and/or the brake actuator 6.

In the description described above, the optical systems arranged in a right-left relation are used. However, a pair of vertically arranged optical systems or a pair of obliquely arranged systems may be used. Namely, the same effect can be obtained even though the reference line is determined to be horizontal, vertical or oblique.

In the description described above, the image sensors 33, 34 are constituted by separate ones which arranged in a right-left relation. However, a single sensor may be used wherein the area of the sensor is divided into two i.e., right and left sections.

Thus, in accordance with the present invention, a preceding car is tracked while the picture image of the object is caught in the windows by using the tracking type range finder and by obtaining the distance to the object on the basis of the deviation of opposition which corresponds to the object formed in the window in the right and left picture images. Accordingly, the preceding car can be certainly tracked while the car interval is controlled. Further, an intervening car entering in a dangerous area can be detected by observing the side and front area of the driving car. Accordingly, if there is an intervening car, an alarm can be generated quickly, and safe and comfortable cruising can be assured for the driver.

Obviously, numerous modifications and variations of the present invention are possible in light of the above teachings. It is therefore to be understood that within the scope of the appended claims, the invention may be practiced otherwise than as specifically described herein.

What is claimed is:

1. A car interval control apparatus which comprises:
   a tracking type range finder comprising: a pair of optical systems arranged in a parallel relation and an image sensor disposed in connection with each of said optical systems, wherein a window is formed in the picture image of an object that is to be tracked and sensed by each of the image sensors, and the distance to the object is measured, in accordance with a triangular method, on the basis of a series of successive shifts of position of the picture image of the object displayed in the window as sensed by one of said image sensors and compared with the position of the picture image sensed by the other of said image sensors;
   an observing means which emits light and observes forcible entry of an intervening car into a line of sight different than the line of sight of either of said pair of optical systems in front of and close to a driver's car by detecting light reflected by the intervening car; and
   a control unit which controls a distance interval between the driver's car and the preceding car by using a signal produced from the tracking type range finder and which generates an alarm when the intervening car is detected by the observing means while the distance interval of the driver's car is being controlled.

2. The car interval control apparatus according to claim 1, wherein a pair of memory devices are provided so as to store picture images sensed by the image sensors.

3. The car interval control apparatus according to claim 1, wherein said observing means comprises a pair of range finders that compare the distance interval between the driver's car and the intervening car with a certain safe distance.

4. A vehicle control apparatus comprising:
   a range finding device comprising:
      a pair of optical lenses, arranged in parallel reaction with each other, for receiving an image of an object directly in front of a vehicle;
      a pair of image sensors, each receiving the image from a respective one of said pair of optical lenses, for converting the image into digital information;
      first and second memory devices for respectively storing digital information concerning the image from one of said pair of image sensors; and
      a control device for successively shifting the digital information in said second memory and comparing such information with the digital information stored in said first memory, said control device producing a difference value for each successive shift and determining which of the successive shifts results in a minimum difference value, said control device calculating a first distance interval that is the distance between the vehicle and the object directly in front of the vehicle taking into account the difference value;
   a pair of observing devices, each located on either side of the vehicle, each for determining a second distance interval that is the distance between the vehicle and an object on either side of the vehicle;
   a brake actuation device for actuating a braking mechanism so as to reduce the speed of the vehicle;
   a warning device for indicating a potential danger; and
   a control unit, coupled to said range finding device, said pair of observing devices, said brake actuation device, and said warning device, for controlling the distance between the vehicle and an object in front thereof or on either side thereof, said control unit receiving information of the first distance interval between the vehicle and the object directly in front thereof, wherein said control unit enables said brake actuation device when the first distance interval is less than a safety distance interval, and wherein said control unit enables said warning device when the second distance interval is less than a dangerous distance interval.

5. The vehicle control apparatus of claim 4, further comprising a throttle actuation device, coupled to said control unit, for increasing the speed of the vehicle, wherein said control unit enables said throttle actuation device when the first distance interval is greater than a cruising distance interval, and wherein said control unit disables said throttle actuation device when the first distance interval is less than a cruising distance interval.

6. The vehicle control apparatus of claim 4, further comprising a speed sensor, coupled to said control unit, for transmitting information to said control unit concerning the speed of the vehicle, wherein said control unit enables said brake actuation device when the second distance interval is less than the dangerous distance interval and the speed of the vehicle is greater than a dangerous speed level associated with the dangerous distance interval.

* * * * *